Feb. 25, 1969 M. R. BARTZ 3,429,993

VIDEO DIGITIZING SYSTEM

Filed Sept. 27, 1965 Sheet 1 of 2

INVENTOR
MAURICE R. BARTZ

BY Francis V. Giolma
ATTORNEY

United States Patent Office 3,429,993
Patented Feb. 25, 1969

3,429,993
VIDEO DIGITIZING SYSTEM
Maurice R. Bartz, Rochester, Minn., assignor to International Business Machines Corporation, Armonk, N.Y., a corporation of New York
Filed Sept. 27, 1965, Ser. No. 490,411
U.S. Cl. 178—7.1 10 Claims
Int. Cl. 3/00, 3/16

ABSTRACT OF THE DISCLOSURE

A digitizing circuit for a video quantizing system applies a quantized signal to a discriminator. A trigger controlled by the discriminator and a clock sets a latch which controls the discharge time of an RC circuit to establish a minimum signal width whereby all quantizer signals must remain in a given state for a predetermined time before changing.

This invention relates generally to opaque image scanners, and it has reference in particular to a digitizing system for use with such a scanner.

More specifically, this invention relates to circuitry for converting the output of a video signal quantizer into a signal which is digital both as to amplitude and width.

Yet another object of the invention is to provide for digitizing a video quantizer signal as to width, as well as amplitude, and for synchronizing such digitized signals with a system clock.

One object of the invention is to insure that all quantizer video signals must remain at the black level for a predetermined time, to cause the digitizer to generate a bit.

Another object of the invention is to provide for insuring that after the quantizer output changes, it must remain in that state for at least a predetermined time before the digitizer can generate a bit representing the new state.

Yet another object of the invention is to provide for using a trigger to furnish the output of a quantized video signal digitizer, and for delaying the effectiveness of a change from black to white in the quantized signal before permitting it to change the level of a voltage discriminator to generate a white bit.

Still another object of the invention is to insure that all quantizer black levels which are present for at least 0.5 microsecond must cause the digitizer to generate a bit at the beginning of the next clock cycle.

It is also an important object of the invention to insure that after the quantizer output changes, it must remain in that state for at least 0.5 microsecond before the digitizer generates the bit representing the new state.

In accordance with a preferred embodiment of the invention, a quantized video signal is applied to a voltage discriminator through an RC delay circuit, and the output is used to control a trigger in conjunction with sampling pulses from a system clock. A latch set by a black signal output from the trigger is used to control the discharge time of the capacitor C when a quantizer pulse longer than one clock cycle occurs, so that the pulse width of the voltage discriminator is equal to the quantized pulse width.

The foregoing and other objects, features, and advantages of the invention will be apparent from the following more particular description of a preferred embodiment of the invention, as illustrated in the accompanying drawings.

Figure 1:
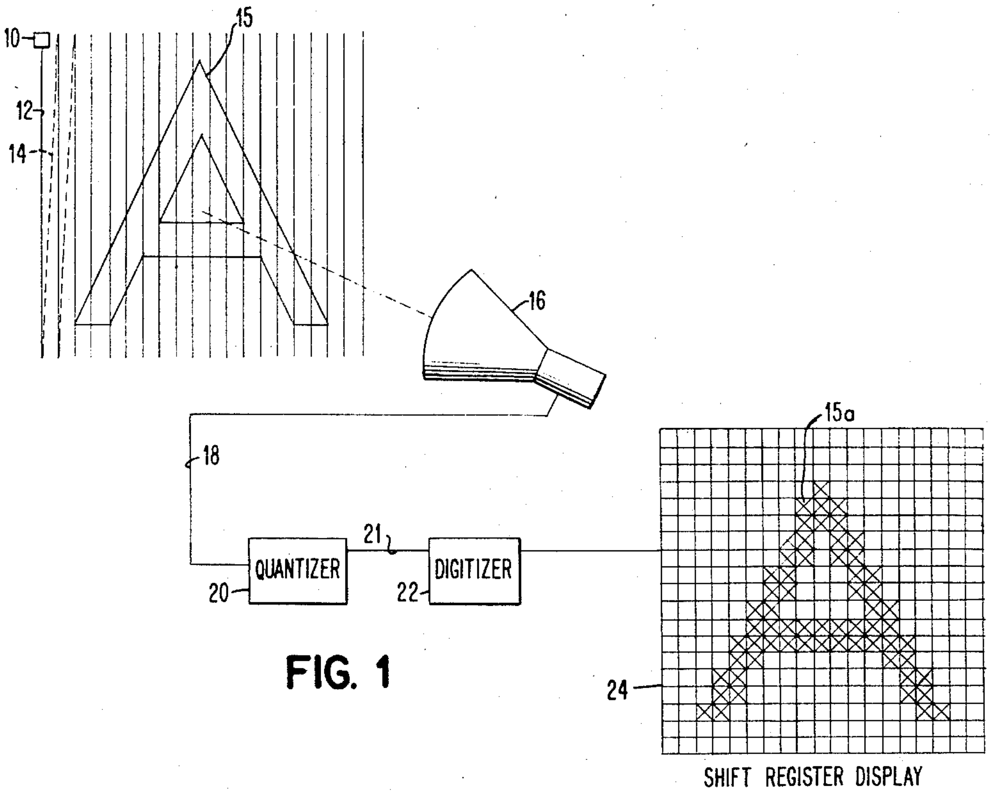
FIG. 1 is a schematic diagram of a video scanning system embodying the invention in one of its forms.

Referring to FIG. 1 of the drawings, it will be seen that the invention deals, for example, with the extraction of information from the document video signal of a cathode ray tube flying spot opaque image scanner. The video signal is generated in a well-known manner by rastering the CRT spot represented by the five mil rectangle 10 across the information on the document plane represented by the numeral 15, in this instance character A. The solid lines 12 denote the operative portion of the trace, while the dotted lines 14 designate the retrace. Reflected light variations which result when the spot crosses a portion of a character are sensed with photomultiplier tubes represented by the tube 16 viewing the document plane, which generates an analog current proportional to the light input. This signal is applied over a conductor 18 to a quantizer 20 of any one of a number of suitable types well known in the art, and thence to a digitizer 22 from whence it is applied to a well-known shift register type display device 24 comprising a matrix of bits corresponding to each cell or five mil area of the document plane, where the document information is stored and/or displayed, as the character A designated by the reference numeral 15*a*.

The function of the quantizer block 20 is to convert the video signal into one of two voltage levels, depending upon whether the video signal is black or white. The purpose of the digitizer block 22 is to convert the quantizer output into a signal which is digital with respect to both amplitude and width, and also falls into synchronism with the system clock.

Figure 2:
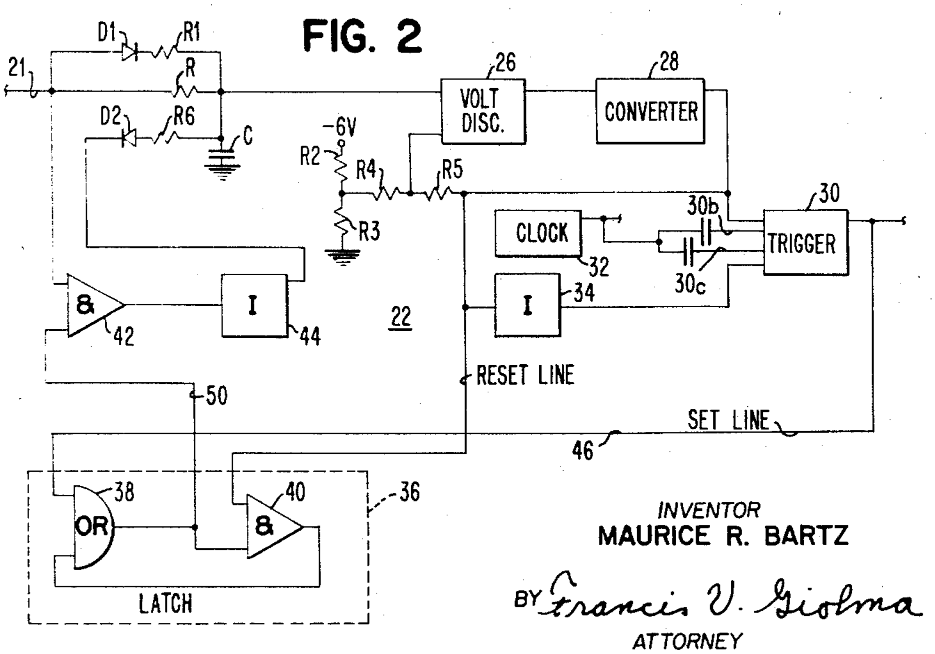
FIG. 2 is a block diagram showing circuit details of the digitizer of FIG. 1.

Referring to FIG. 2, it will be seen that the quantized video signals from the quantizer 20 are applied over conductor 21 to a voltage discriminator 26 through an RC circuit, including a capacitor C connected to ground and a resistor R connected in series with the conductor 21. A diode D1 and a resistor R1 connected in shunt with the resistor R provide an asymmetric circuit for giving different charge and discharge times to the capacitor C. The output of the voltage discriminator is connected through a converter 28 which converts the output level of the voltage discriminator to a level suitable for operating a trigger 30. In this instance, the +3 to 0 output of the voltage discriminator is converted to a 0 to —6 output level for operating the trigger 30.

The reference level for the voltage discriminator 26 is provided by a voltage divider comprising resistors R2 and R3 connected between —6 and ground, with an additional divider comprising resistors R4 and R5 connected from the midpoint of the resistors R2 and R3 to the output of the converter 30. The alternating current set inputs 30*b* and 30*c* of the trigger 30 are connected to the system clock 32, which may be a 1 megacycle per second clock, for example. Reset of the trigger 30 is effected through an inverter 34, which is connected to the output of the converter 28. A latch 36 comprising an OR circuit 38 and an AND circuit 40 is connected to the output of the trigger 30, the output being connected to an AND circuit 42, which also has an input from the quantized video input conductor 21 for controlling an inverter 44 which provides a discharge path through resistor R6 and diode D2, so that when the quantizer output drops to a white level, the inverter output also drops, helping to discharge the capacitor C through R6.

The following design criteria have been established to determine the color of a cell:

(1) All quantizer black levels which are present for at least 0.5 microsecond, equivalent to half a cell, must cause the digitizer to generate a bit at the beginning of the next clock cycle.

(2) After the quantizer output changes states, it must remain in that state for at least 0.5 microsecond before the digitizer generates a bit representing the new state.

Although the scanner is not required to recognize lines which are much smaller than five mils, due to distortion in the video system leading up to the digitizer, a 5 mil line on the document may generate only a 0.5 microsecond pulse at the quantizer output, where it should really be 1 microsecond wide. Therefore, criterion Number 1 insures that a bit will be generated when the spot crosses a five mil line. Criterion Number 2 insures that the digitizer does not generate a bit which is due to a quantizer noise pulse.

Referring in detail to FIG. 2 of the drawings, when the input from the quantizer over conductor 21 to the digitizer 22 switches to a black level (+Y), the capacitor C charges toward +Y through R and R1. When the voltage on C rises above −1.5 volts, which is the threshold level applied to the reference input of the voltage discriminator 26 from the voltage divider R2–R3, R4–R5, the output of the voltage discriminator 26 changes states, which causes the converter 28 output to drop to a −Y level. Because the converter output is fed back into the reference input of the voltage discriminator through the resistor R5, the reference drops to −4.5 volts. The time constant $(R1/R)C$ is adjusted so that the operation described takes 0.5 microsecond to be completed. This assures that the quantizer black level is present for at least 0.5 microsecond before the digitizer 22 can generate a black bit. The output of the voltage discriminator 26 is then sampled by the 1 megacycle per second system clock 32, as shown by the curve *a* in FIG. 3. Since the clock drives the AC inputs of trigger 30, only the edge of the sample pulse is important. The pulse width has no real significance.

If the quantized video signal on conductor 21 switches to white (−Y), after the voltage discriminator 26 has changed states, and before a bit has been generated at the output of the trigger 30, capacitor C discharges through resistor R. The discharge time constant RC is chosen to make the voltage discriminator output stay at a black level for at least 1 microsecond. This insures that at least one of the sample pulses from the clock will be coincident with the voltage discriminator output, and therefore a bit will be generated by the trigger 30. This operation therefore assures that any quantizer pulse which is at least 0.5 microsecond long, will cause the digitizer to generate a bit. When the voltage on capacitor C drops below −4.5 volts, the voltage discriminator 26 changes states, causing the converter 28 output to rise to a +Y level. The reference, therefore, returns to a −1.5 volts and the digitizer returns to its initial state.

Figure 3:
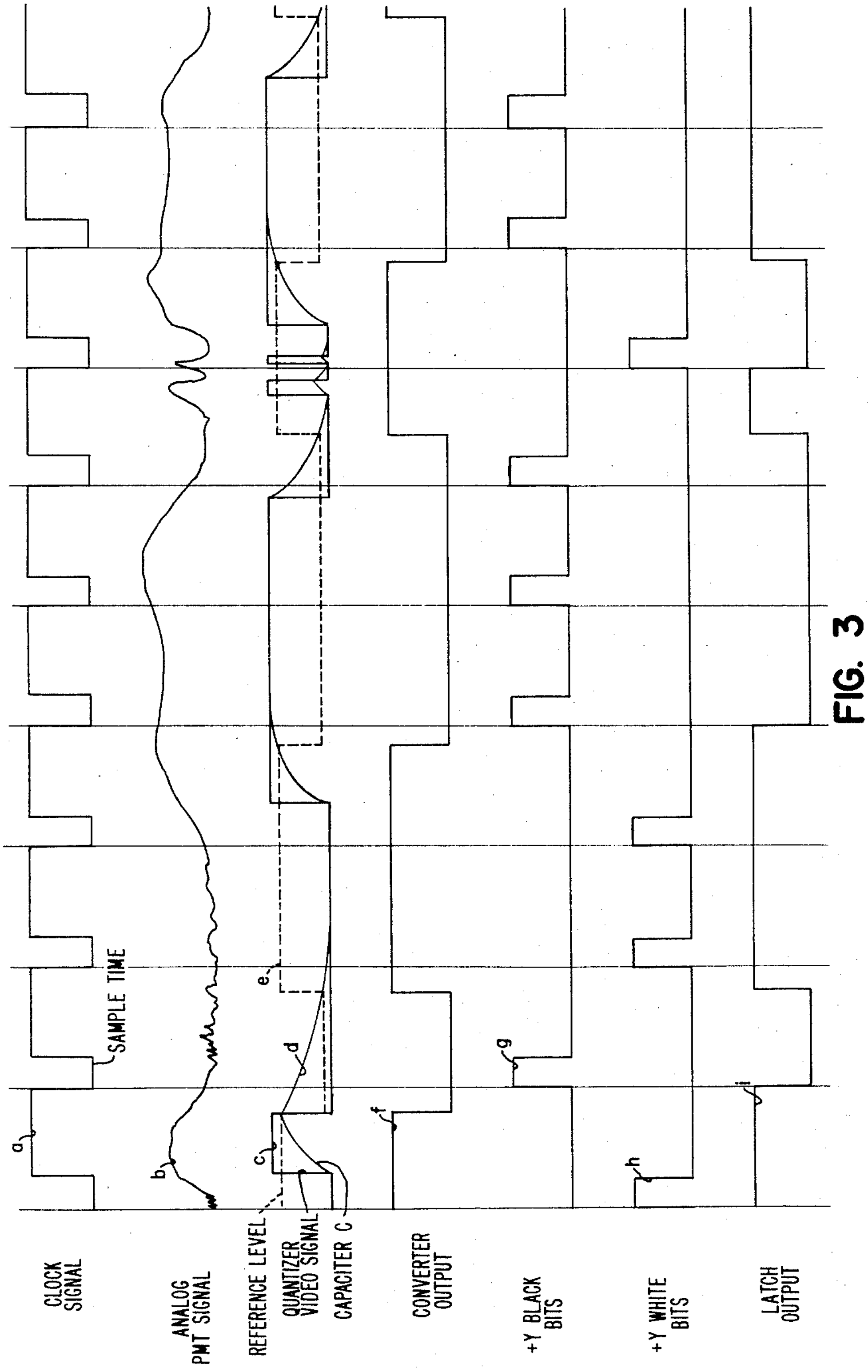
FIG. 3 shows a set of curves illustrating characteristic waveforms at various points in the video system and in particular the digitizer of FIGS. 1 and 2.

For quantizer pulses which are longer than the time it takes for a one clock sample pulse to occur, it is desirable to discharge the capacitor C at a rate such that the pulse width of the voltage discriminator 26 is equal to the quantized pulse width. This is accomplished by setting the latch 36 with the first digitizer output pulse over the set line conductor 46, which is one input to the OR circuit 38. The latch output over conductor 50 conditions the quantizer video gate AND circuit 42, so that when the quantizer output drops to a white level (−Y), the output of the inverter 44 also drops to a −Y level, helping to discharge the capacitor C through R6. The discharge time made up of $(R/R6)C$ is set so that it takes 0.5 microsecond to discharge C down to the −4.5 volts reference level. This forces the quantizer level to remain at a white level for at least 0.5 microsecond before a white bit can be generated. When the voltage on the capacitor C falls below −4.5 volts, the discriminator output switches back to the white condition and resets the latch 36. The digitizer output pulses are generated by "ANDing" the output of the converter 28 in the case of a black bit, or its complement in the case of a white bit, with the system clock to set the trigger 30. The converer 28 merely functions to change the output level of the voltage discriminator 26 into −Y voltage levels. Curves for the above operations are shown in FIG. 3 of the drawings, in which the curve *b* represents the analog photomultiplier tube signal; the curve *c*, the quantized video signal from the quantizer 20; the curve *d*, the voltage of the capacitor C; and the dotted line *e*, the reference level applied to the voltage discriminator 26. The output of the converter 28 is represented by the curve *f*; the curves *g* and *h* represent the white and black gate inputs to the trigger 30, while the curve *i* represents the output of the latch 36.

While the general theory behind the operation of the digitizing system has been explained in connection with its use in a flying spot opaque scanner, the system may lend itself to many other applications. The cathode ray tube velocity on the document plane in the above application is five mils per microsecond while reading characters. The raster scans are 32 microseconds long or the equivalent of 160 mils on the document plane, $$\left(\frac{5 \text{ mils}}{\text{microseconds}} \times \frac{32 \text{ microseconds}}{\text{scan}} = \frac{160 \text{ mils}}{\text{scan}}\right)$$

Adjacent scans are spaced at five mil increments as shown in FIG. 1. A 1 megacycle system clock is used to establish the raster frequency, and a bit is entered into the shift register display once every clock cycle. One bit represents a five mil square or cell on the document plane. The digitizing system decides whether to call each cell black or white on the basis of the quantized video signal. A quantizer voltage level actually represents the color (black or white) of the document as the CRT spot traverses the cell from top to bottom. A black quantizer level which is present for 1 microsecond represents a black five mil square on the document.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. The combination in a video scanning system having a quantizer for digitizing the amplitude of video signals and having a clock pulse system of:
   - a voltage discriminator having a signal input, a signal output and a reference level input,
   - means including a delay circuit connecting the quantizer to the discriminator signal input, and
   - means including a gated input device connected to the clock pulse system and the discriminator signal output for providing a digitized output signal synchronized with the clock pulse system.

2. The combination in a video digitizing system for use in a document scanner having a video signal quantizer and a system clock of:
   - a voltage discriminator having an input, an output and a reference signal terminal,
   - delay means connecting the quantizer to the discriminator input,
   - voltage divider means connecting the reference signal terminal to a reference source,
   - a trigger having white and black gate terminals,
   - circuit means connecting the voltage discriminator output to the white gate terminal and to the voltage divider for controlling the reference signal terminal level,
   - inverter means connecting the voltage discriminator output terminal to the trigger black gate terminal, and
   - circuit means including a latch set by the trigger output and reset by the voltage discriminator output connected to the delay circuit for controlling the time constant thereof.

3. A digitizing circuit for use with a video signal quantizer in a document scanning system having a clock with a predetermined pulse cycle comprising:
a voltage discriminator having a video signal input, an output and a reference signal input,
an RC relay circuit connecting the discriminator video signal input to the quantizer,
a voltage divider network connecting the reference level input to a reference source,
a trigger having a digitized output, black and white gate inputs and A-C set inputs;
circuit means connecting the voltage discriminator output to the voltage divider network and the white gate for controlling the discriminator reference level and the trigger operation,
and means including a latch controlled by the trigger digitized output for changing the time constant of the RC circuit.

4. The combination in a video scanning system having a quantizer for digitizing a video signal and having a system clock:
of a voltage discriminator,
means including a controllable delay circuit connecting the quantizer to the voltage discriminator,
a trigger connected to be set by the voltage discriminator, and
means including a latch connected to the trigger and the delay circuit to be set by the trigger for changing the time constant of the delay circuit.

5. The combination in a video digitizer for use in a document scanning system having a video signal quantizer and a system clock of:
a voltage discriminator,
means including an adjustable delay circuit connecting the voltage discriminator to the quantizer,
a trigger having a pair of gate terminals and corresponding A-C set terminals,
circuit means connecting the A-C terminals to the system clock,
additional circuit means connecting one of the gate terminals to the voltage discriminator,
an inverter connecting the discriminator to the other gate terminal,
and means connecting the delay circuit and the trigger including a latch set by the trigger to adjust the delay of the delay circuit.

6. In a digitizing circuit for use with a video signal quantizer in a document scanning system having a clock:
a voltage discriminator,
means including an adjustable RC circuit connecting the voltage discriminator to the quantizer,
a trigger connected to the clock and the voltage discriminator to be set thereby,
and means including a latch connected to the trigger and the adjustable RC circuit to be set by the trigger for changing the time constant of the RC circuit.

7. In a digitizer:
a voltage discriminator,
circuit means including an adjustable RC circuit connecting the discriminator to a source of quantized video signals,
a trigger having gate and set connections to the voltage discriminator and a source of clock pulses to provide an output synchronized with a clock pulse,
and means including a latch connected to the trigger, discriminator and the RC circuit to be set by the trigger to adjust the RC time constant and reset by a change in level of the discriminator.

8. In a digitizer for a video system having a quantizer and a system clock:
a voltage discriminator,
means including an RC delay circuit connecting the discriminator to the quantizer,
a trigger connected to the clock and the discriminator to produce a digitized output,
an inverter connecting the discriminator and the trigger to reset the trigger,
a latch connected to be set by said digitized output, said latch having a set output connected to provide a circuit for modifying the resistance value of the RC circuit,
and circuit means connecting the discriminator and latch to effect reset of the latch.

9. In a digitizer for a video system having a quantizer and a one million cycles per second clock system:
a voltage discriminator,
means connecting the quantizer and discriminator including an RC delay circuit comprising a resistor and a capacitor having a delay time of one-half microsecond,
voltage divider means providing a reference level for the discriminator,
a trigger having a pair of A-C set terminals connected to the clock and a pair of gate terminals,
a latch,
circuit means connecting the discriminator to one of the trigger gate terminals to set the trigger and to the voltage divider means,
additional circuit means connecting the trigger to the latch to provide for setting the latch,
means including an AND circuit connected to the latch and to the quantizer to provide a discharge path for the capacitor,
and an inverter connecting the voltage discriminator to the other gate terminal of the trigger to reset the trigger.

10. In a digitizer for a video scanning system having a video signal quantizer and a system clock:
a voltage discriminator having an input terminal, an output terminal and a reference signal terminal,
delay means including an RC circuit having a capacitor and at least a pair of resistance paths one of which includes an asymmetric conducting device, said delay means connecting the discriminator input terminal to the quantizer,
a trigger having set inputs connected to the clock and a pair of gate inputs,
a latch,
voltage divider means connecting the reference signal terminal to a reference source,
circuit means connecting the voltage discriminator output terminal to one of said gate inputs and to the latch for setting the latch,
logic circuit means connecting the latch and the quantizer to provide a discharge circuit for the capacitor,
and an inverter connecting the voltage discriminator output terminal to another of said gate inputs.

References Cited

UNITED STATES PATENTS 3,294,896 12/1966 Young ---------------- 178—6

ROBERT L. GRIFFIN, *Primary Examiner.*

ROBERT L. RICHARDSON, *Assistant Examiner.*

U.S. Cl. X.R.

307—269; 328—151

PO-1050
(5/69)

UNITED STATES PATENT OFFICE
CERTIFICATE OF CORRECTION

Patent No. 3,429,993 Dated February 25, 1969

Inventor(s) Maurice R. Bartz

It is certified that error appears in the above-identified patent and that said Letters Patent are hereby corrected as shown below:

Column 5, line 6, "relay" should read --delay--; column 5, line 38, after "A-C" insert --set--, which was omitted.

SIGNED AND
SEALED
SEP 30 1969

(SEAL)
Attest:

Edward M. Fletcher, Jr.
Attesting Officer

WILLIAM E. SCHUYLER, JR.
Commissioner of Patents